F. KORTICK.
Hook.
No. 207,877. Patented Sept. 10, 1878.
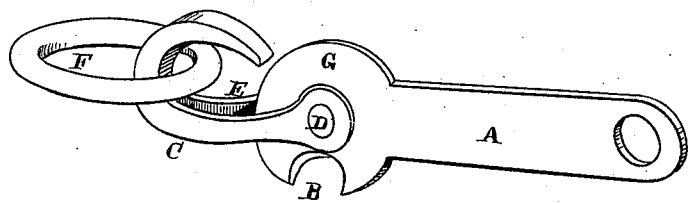
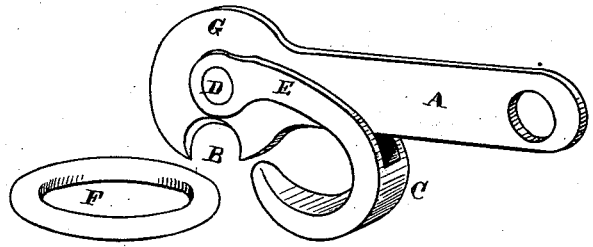
Witnesses
Geo. H. Strong.
Frank A. Brooks
Inventor
Frank Kortick
by Dewey & Co.
Attys

UNITED STATES PATENT OFFICE.

FRANK KORTICK, OF SAN FRANCISCO, CALIFORNIA.

IMPROVEMENT IN HOOKS.

Specification forming part of Letters Patent No. 207,877, dated September 10, 1878; application filed July 29, 1878.

*To all whom it may concern:*

Be it known that I, FRANK KORTICK, of the city and county of San Francisco, and State of California, have invented a Link-Connection and Lock; and I do hereby declare the following to be a full, clear, and exact description thereof, reference being had to the accompanying drawings.

My invention relates to a link-connection and lock which is intended more particularly for use in connection with the bits on harness, or as an attachment on the whiffletrees, by which the tugs may be connected to them.

My improvements consist in the employment of a hook having a slotted shank, which receives the link, the hook being pivoted, so that its center of motion is in the center of the circular head of the connecting-bar, and the point of the hook lies so near the edge of this disk that it prevents the link or ring from being removed unless the hook is turned to a point where a semicircular notch is formed in the head, so that the ring may drop into this notch and allow the hook to swing past it, when it may be removed. At all other times it will be securely locked in place.

Figures 1 and 2 are views of my device.

Let A represent a metallic bar or arm having a hole at its rear end, by which it may be connected with a whiffletree or other object by means of a bolt or otherwise. The head of this arm A is somewhat enlarged and made rounded, as shown at G, and has a semicircular or other shaped slot, B, cut in its edge. A hook, C, is pivoted to the center of the head of the arm A by a pin, D, the upper end or shank, E, of said hook being formed in two parts, or bifurcated, and the pin passing through both parts, as shown. The point of this hook is slightly turned back, and, when moving around on its pivot, said point passes very close to the edge of the enlarged circular head G of the arm at all parts of the circle.

When placed on a whiffletree the link-connection is so placed that the slot on the head of the arm is down, and the hook also hangs downward. By drawing the hook back underneath it passes by the slot, leaving said slot open. A ring, F, attached to the harness, may then be placed in the slot and held up against the head and the hook allowed to drop back, when the ring will be inclosed in such a manner that it will be impossible for it to escape. Said ring will then rest in the hook and will swing with it, but cannot escape, as there is not sufficient room for it to pass between the edge of the enlarged head and the point of the hook. The only way to release the ring is to push it into the slot and hold it up while pushing the hook back. At all other times the hook will inclose so as to effectually lock the ring in.

This connection may be used for whiffletrees on the bits of bridles, for hitching traces to plows, and similar purposes. Its advantages are the simple method by which the connection is made or unmade and the impossibility of unlocking it except when desired.

I am aware that solid hooks have been made with slotted circular plates pivoted on the sides thereof; but this construction of a solid hook is less compact than my device, and the slotted plates are liable to be accidentally turned so as to release the ring.

Having thus described my invention, what I claim as new, and desire to secure by Letters Patent, is—

The connecting-bar A, having the circular disk-head G, slotted or notched at B, in combination with the hook C, provided with a slotted or bifurcated shank, and pivoted to the center of the head, so that it may be moved past the notch to allow the link F to be introduced or removed, substantially as herein described.

In witness whereof I hereunto set my hand.

FRANK KORTICK.

Witnesses:
FRANK A. BROOKS,
M. A. NEAL.